Patented June 1, 1937

2,082,306

UNITED STATES PATENT OFFICE 2,082,306

NITROGENOUS CONDENSATION PRODUCTS AND PROCESS OF MAKING SAME

Theodor Sutter, Basel, Switzerland, assignor to the firm of Society of Chemical Industry in Basle, Basel, Switzerland No Drawing. Application May 18, 1934, Serial No. 726,414. In Switzerland May 24, 1933

8 Claims. (Cl. 260—2)

This invention relates to potentially reactive nitrogenous condensation products useful in the manufacture of synthetic resins, lacquers and the like and it comprises the nitrogenous condensation products themselves and a process of making same.

It is known that phenols which contain active methylene-groups, for example hydroxymethyl- or chloromethyl-groups, easily resinify to form insoluble compounds.

When phenol-mono-alcohols are condensed with aromatic amines there are obtained, without taking special precautions, hydroxyamine bases. For example by boiling saligenin with aniline, ortho-hydroxybenzylaniline is produced.

Also phenol-polyalcohols and their homologues and analogues yield with an excess of amine similar products which are mostly soluble in benzene, in acetone and in mixtures of alcohol and benzene.

The phenol-polyalcohols, and their analogues, however, behave quite differently when condensed with amine bases in proportion smaller than is necessary for saturating all the active methylene groups, for then the condensation proceeds quickly with formation of insoluble and infusible resins.

For example, when a mixture of 1 mol. phenol-dialcohol with 1 mol. aniline is boiled it soon thickens with formation of an insoluble, infusible resin.

In analogy with the reaction of saligenine with aniline, the reaction presumably consists in forming a hydroxyamine base of the type

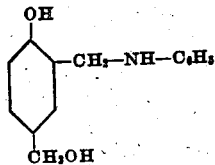

which resinifies quickly at elevated temperatures through the medium of the very active methylol group. Reaction products designed in the older literature as "phenol alcohols" and obtained by heating phenols with formaldehyde in presence of alkaline or acid catalysts contain much less than one methylol group for each phenol nucleus, the remaining methylene groups being present in form of methylene links of the type of dioxydiphenylmethane and are therefore not suitable for the present process.

The expression "phenolpolyalcohols" as employed in this application, is used in the strict sense of the word, namely, phenols containing a plurality of free reactive methylol groups.

The present invention is based on the observation that hydroxyamine bases which still contain active methylene-groups, preferably methylol-groups, can be obtained in easily soluble condition, apparently monomeric or at least of comparatively low molecular weight, if the condensation be interrupted at the correct moment. The permissible duration of reaction depends fundamentally on the conditions, such as temperature, and the presence or absence of condensing agents, the proportion of such an agent and its degree of activity; also on the degree of dilution of the components and other conditions. Preliminary experiment suffices for determining the permissible duration of reaction in each case. Thus from cresol-dialcohol and aniline in aqueous, feebly alkaline or neutral suspension, there are obtained, even after several hours heating at 95° C., products soluble in alcohol; in weak acid medium the solubility is somewhat diminished already after a reaction period of 2 hours and therefore a closer watching of the reaction is advisable; in strongly acid solution there are produced, already at 50° C., sparingly soluble condensation products, which are less suitable for the present process. The condensation may also be conducted in organic solvents, for instance alcohol.

The condensation is, of course, interrupted as soon as a sample of the mass indicated a diminution of solubility.

Although the new bases have a pronounced tendency to polymerization or condensation and are what is called potentially reactive, they can be freed in a surprising manner from volatile impurities by treating them at a moderate temperature, preferably under diminished pressure, with inert gases or vapours, preferably steam. While it is practically impossible to free potentially reactive phenol-formaldehyde resins from phenols and other strong smelling impurities, the new products may be freed from the last traces of phenols and other impurities, such as tar bases and hydrocarbons present in crude technical cresol mixtures without unduly affecting the solubility of the products. The invention makes possible the use of very cheap parent materials, such as the commerical crude cresols and, indeed, tar oil containing cresol, so that these valuable products may be produced easily and cheaply. When purer parent materials are used there are obtained in a more simple manner products, which are practically free from odour when the product is spread in a thin layer, for example by mixing it with a filling material or by spreading it on a fibrous web and exposing it to a moderate temperature, about 50–100° C., under diminished pressure, for instance in a vacuum drying chamber. The very small quantity of volatile impurities that are present is sufficiently removed by this simple expedient. It is entirely new to obtain hardenable resins which yield absolutely inodorous molded products by starting from impure and therefore cheap phenols.

The invention makes it possible therefore to obtain the most various hydroxyamine bases practically pure and in a form remarkably favourable for commercial purposes, since in most cases it is possible to obtain them in the form of thick oils, soft resins or bodies solid at the ordinary temperature, the product being soluble in ordinary alcohol or in a mixture of alcohol and benzene, or in acetone, according to the degree of condensation.

As parent materials there come into use chiefly methylol and chloromethyl-derivatives of hydroxyaryl compounds, such as mono- or polynuclear phenols substituted or not with alkyl or aryl groups, for instance phenol, cresols, hydroxydiphenyl, isopropyldihydroxydiphenyl and the like, as well as of their ethers, for example the alkyl, hydroxyalkyl or polyhydroxyalkyl ethers, and the like; examples of suitable amines are aniline, mono- and dialkylanilines and their homologues, as well as polynuclear amine bases and methylene-amine bases, like aminobenzylaniline, diaminodiphenylmethane, benzidine, or the like.

The ethers of the phenol-polyalcohols, for instance, show less disposition to resinify than the free phenols show.

The following examples illustrate the invention, the parts being by weight, unless otherwise stated:—

Example 1

72 parts of commercial crude cresol of 97–100 per cent. strength are dissolved in 80 parts of caustic soda solution of 36° Bé., and, after cooling, 40 parts of ice are added. Into this mixture there are poured rapidly, while cooling, 125 parts of cooled formaldehyde of 40 per cent. strength by volume. The vessel is preferably cooled with ice and if the temperature in spite of this rises above 10° C., ice is added to the solution. After 3–5 days the odour of formaldehyde has disappeared. On the other hand, the solution smells strongly of pyridine bases and naphthalene, which has separated in crystalline flocks.

In a stirring vessel capable of being heated there are added to the solution of polymethylolcresols prepared as described above, 96 parts of aniline and the whole is neutralized with about 58 parts of hydrochloric acid of 21° Bé. After stirring, without addition of heat, for 12 hours, 2–3 parts of concentrated hydrochloric acid are added and the whole is heated for 1 hour at 95° C. A sample is now mixed with sodium carbonate and the resin separated. It dissolves freely in alcohol. The mixture is now neutralized with sodium carbonate, the salt solution withdrawn and the oily condensation product transferred to a still. At about 60° C. and under a pressure of about 60 mm. of mercury, steam is sucked through the still until all volatile constituents have been removed, which takes about 1–1½ hours. Then the steam is turned off and at the same temperature the residual water is distilled. The thick oil containing salt thus obtained is run through a pressure filter whereby there is obtained a viscid mass which may have the consistency of soft paraffin. The yield corresponds approximately with the theory.

If there be added during the condensation 10 parts of concentrated hydrochloric acid instead of the 2–3 parts, the duration of the reaction can be shortened, or with the same duration of reaction there can be obtained a solid resin which softens at about 40° C. and is no longer soluble in alcohol, but dissolves in mixtures of alcohol and benzene or in acetone.

Example 2

An aqueous alkaline solution of polymethylolphenol, made analogously to the method described in Example 1 from 1 mol. phenol, about 1 mol. caustic soda and 2.2 mols of formaldehyde, is mixed with 1 mol. aniline and the mixture is neutralized by passing carbon dioxide through it and then heated for 2 hours while stirring well at 95° C. The somewhat thin oil is allowed to settle, the supernatant salt solution is withdrawn and the resin is washed several times with hot water. It is freely soluble in alcohol. This thickly oily product is now mixed with an equal weight of woodmeal and the mass is dried in a vacuum at 60–70°, whereby there is obtained a practically odourless mixture of the organic base with woodmeal.

Example 3

460 parts of an aqueous alkaline solution of polymethylolcresols, obtained as described in Example 1 and containing about 1 mol. are mixed with 140 parts of mono-ethylaniline and the mixture is neutralized with hydrochloric acid and then 50 parts of hydrochloric acid of 10 per cent. strength are added. After stirring well for 2 hours at 95° C., the mass is neutralized with sodium carbonate and the separated oil is washed and distilled in a vacuum at 60° C. by means of steam. There remains 200 parts of a viscous resin which is soluble in alcohol.

Example 4

The procedure is as in Example 3 with the exception that dimethylaniline is substituted for the ethylaniline. After the steam distillation there are obtained 210 parts of a nearly colorless, viscous hydroxyamine base soluble in alcohol.

Example 5

300 parts of formaldehyde of 40 per cent. strength and 200 parts of concentrated hydrochloric acid are mixed together and the mixture is saturated with hydrochloric acid gas while cooling. There are now dropped in at 40° C. in the course of 2 hours, 90 parts of crude cresol while stirring well and the mixture is allowed to stand for several hours. The oil which has separated is now washed with water, dissolved in ether and the solution dried with sodium sulfate. The ethereal solution is then distilled at a low temperature until the greater part of the ether has been removed; the residue which consists in a mixture of poly-chloromethylene-cresols, containing about two chloromethylene groups in each cresol nucleus is dissolved in acetone and this solution is dropped, while vigorously stirring, into a suspension of 75 parts of aniline and 180 parts of sodium bicarbonate in about 200 parts of water. There is formed a viscid resin which, after decanting the aqueous layer, may be dissolved in a mixture of benzene and alcohol and the solution boiled for some time with solid sodium carbonate in a reflux apparatus. After filtering the residue and distilling the solvent in a vacuum, there is obtained a viscid residue which is very similar to the residue obtained as described in Example 1.

*Example 6*

57 parts of para-hydroxydiphenyl are dissolved in 33 parts by volume of concentrated caustic soda solution of 36° Bé., and 130 parts of water and, after cooling this solution, there are added 100 parts of formaldehyde. As the sodium salt of the hydroxydiphenyl is sparingly soluble in cold water the mixture is heated for some time at 50° C. whereby dissolution occurs. After cooling, dilute acetic acid is added to precipitate the polymethylol-compound which has been formed; this is dried preferably in vacuo at temperatures not exceeding 70° C. To a solution of this body in 100 parts of alcohol, 30 parts of aniline and 1 part of glacial acetic acid are added and the whole is heated on the water-bath until everything has dissolved and there has separated a thick reddish oil, which is soluble in alcohol, particularly after addition of acetone.

*Example 7*

To 230 parts of an aqueous alkaline solution of polymethylolcresol prepared as described in Example 1 (one half mol.), there are added, by drops, at the ordinary temperature, while stirring well, 70 parts of dimethylsulfate, whereupon the methylether soon separates as a thin oil. When all the dimethylsulfate has been consumed the oil is washed with dilute caustic soda solution suspended in 200 parts of water and mixed with 47 parts of aniline and 10 parts of hydrochloric acid of 10 per cent. strength. After boiling for 2 hours, the mixture is neutralized with sodium carbonate and the thin fluid oil is washed with water. This oil is then dissolved in alcohol and the solution is boiled for some time in a reflux apparatus with 40 parts of formaldehyde; there is obtained a product comparatively rich in formaldehyde and soluble in alcohol.

*Example 8*

230 parts of isopropyldiphenol (1 mol.) are dissolved in 400 parts of caustic soda solution of 10 per cent. strength and, while cooling with ice, 375 parts by volume of formaldehyde solution of 40 per cent. strength are added. The crystals of the sodium salt which first separate soon re-dissolve. The whole is allowed to stand for some days and, while cooling, hydrochloric acid is added until neutral reaction is attained. There separates 332 parts of oil. This oil is mixed with 180 parts of benzidine, the mixture is dissolved in 500 parts of alcohol and the whole is boiled with addition of 2 parts of glacial acetic acid for 3 hours in a reflux apparatus. The fairly clear solution is then poured into an excess of dilute caustic soda solution and the unattacked benzidine is separated by filtration. By acidifying the filtrate with glacial acetic acid the new product is obtained in the form of a yellow resin, solid in the cold and soluble in alcohol.

*Example 9*

A solution of polymethylolcresols made as described in Example 1 is completely neutralized while cooling, and the separated reddish oil is removed. 40 parts of this aqueous oil (about ⅕ mol.) in 50 parts of alcohol are mixed with a solution of 40 parts of aminobenzylaniline in 100 parts of alcohol and 3 parts of glacial acetic acid and the mixture is heated for 1 hour on the water-bath. After separating the solvent in a vacuum the product is freed, by steam distillation at a low temperature, from volatile admixtures. The viscous resin is soluble in a mixture of alcohol and benzene.

What I claim is:—

1. A process for the manufacture of potentially reactive nitrogenous condensation products which have softening points substantially below 40° C. and are soluble in low boiling solvents, from aromatic amines and phenols which contain more than one radical of the formula $CH_2X$, wherein X stands for a member of the group consisting of OH and Cl, the C being attached directly to an aromatic carbon, said process comprising condensing the said substances in the presence of a diluent in the proportion of about one mol. of amine for each phenolic nucleus, and interrupting the condensation as soon as a sample of the mass indicates a diminution of solubility in the desired low boiling solvent.

2. A process for the manufacture of potentially reactive nitrogenous condensation products which have softening points substantially below 40° C. and are soluble in low boiling solvents, from aromatic amines and ethers of phenols which contain more than one radical of the formula $CH_2X$, wherein X stands for a member of the group consisting of OH and Cl, the C being attached directly to an aromatic carbon, said process comprising condensing the said substances in the presence of a diluent in the proportion of about one mol. of amine for each phenolic nucleus, and interrupting the condensation as soon as a sample of the mass indicates a diminution of solubility in the desired low boiling solvent.

3. A process for the manufacture of potentially reactive nitrogenous condensation products which have softening points substantially below 40° C. and are soluble in low boiling solvents, from one molecular proportion of a polymethylol-phenol and one molecular proportion of aniline, said process comprising condensing the said substances in the presence of a diluent, and interrupting the condensation as soon as a sample of the mass indicates a diminution of solubility in the desired low boiling solvent.

4. Nitrogenous potentially reactive condensation products, which have softening points substantially below 40° C. and are soluble in low boiling solvents, obtained from aromatic amines and phenols which contain more than one radical of the formula $CH_2X$, wherein X stands for a member of the group consisting of OH and Cl, the C being attached directly to an aromatic carbon, by condensing the said substances in the presence of a diluent in the proportion of about one molecular proportion of amine for each phenolic nucleus, and interrupting the condensation as soon as a sample of the mass indicates a diminution of solubility in the desired low boiling solvent.

5. Nitrogenous potentially reactive condensation products, which have softening points substantially below 40° C. and are soluble in low boiling solvents, obtained from aromatic amines and ethers of phenols which contain more than one radical of the formula $CH_2X$, wherein X stands for a member of the group consisting of OH and Cl, the C being attached directly to an aromatic carbon, by condensing the said substances in the presence of a diluent in the proportion of about one molecular proportion of amine for each phenolic nucleus, and interrupting the condensation as soon as a sample of the mass indicates a diminution of solubility in the desired low boiling solvent.

6. A nitrogenous potentially reactive condensation product, which has a softening point substantially below 40° C. and which is soluble in low boiling solvents, obtained by interacting one molecular proportion of a polymethylolphenol and one molecular proportion of aniline in the presence of a diluent, and interrupting the reaction as soon as a sample of the mass indicates a diminution of solubility in the desired low boiling solvent.

7. A nitrogenous potentially reactive condensation product, which has a softening point substantially below 40° C. and which is soluble in low boiling solvents, obtained by interacting one molecular proportion of a polymethylolcresol and one molecular proportion of aniline in the presence of a diluent, and interrupting the reaction as soon as a sample of the mass indicates a diminution of solubility in the desired low boiling solvent.

8. A process for the manufacture of potentially reactive nitrogenous condensation products, which have softening points substantially below 40° C. and are soluble in low boiling solvents, from aromatic amines and compounds of the formula $ROR_1$ wherein R stands for a member of the group consisting of H, alkyl, hydroxyalkyl and polyhydroxyalkyl and wherein $R_1$ stands for an aromatic residue which contains more than 1 radical of the formula $CH_2X$, wherein X stands for a member of the group consisting of OH and Cl, the C being attached directly to an aromatic carbon, said process comprising condensing said amines and compounds in the presence of a diluent in the proportion of about one mol. of amine for each phenolic nucleus, and interrupting the condensation when a sample of the mass indicates a diminution of solubility in the desired low boiling solvent.

THEODOR SUTTER.